United States Patent [19]

Yamane

[11] Patent Number: 4,464,897
[45] Date of Patent: Aug. 14, 1984

[54] EXHAUST MANIFOLD FOR AN INTERNAL COMBUSTION ENGINE PROVIDED WITH A TURBOCHARGER

[75] Inventor: Ken Yamane, Yokosuka, Japan

[73] Assignee: Nissan Motor Company, Limited, Kanagawa, Japan

[21] Appl. No.: 356,270

[22] Filed: Mar. 9, 1982

[30] Foreign Application Priority Data

Mar. 10, 1981 [JP] Japan ................................ 56-34189

[51] Int. Cl.³ .......................... F02B 27/02; F01N 7/10
[52] U.S. Cl. ........................................ 60/313; 60/323; 60/605
[58] Field of Search ................. 60/313, 323, 605, 597, 60/598

[56] References Cited

U.S. PATENT DOCUMENTS 3,948,052  4/1976  Merkle ................................... 60/605
4,022,019  5/1977  Garcea .................................. 60/323

FOREIGN PATENT DOCUMENTS 2021600  11/1971  Fed. Rep. of Germany .
2632881   2/1977  Fed. Rep. of Germany ........ 60/293
960110    6/1964  United Kingdom .................. 60/602
996055    6/1965  United Kingdom .

Primary Examiner—Douglas Hart
Attorney, Agent, or Firm—Lowe King Price & Becker

[57] ABSTRACT

An exhaust manifold for a four-cylinder in-line internal combustion engine provided with a turbocharger is disclosed wherein a first exhaust duct and a second exhaust duct are connected to an upper exhaust gas outlet of a turbocharger-mounting flange roughly symmetrically with respect to the center of the turbocharger installing flange. A single third exhaust duct is connected to the lower exhaust gas outlet of the turbocharger-mounting flange. In the exhaust manifold according to the present invention, it is possible to effectively utilize cyclic exhaust gas pressure variation to induce exhaust gas pressure resonance for boosting turbocharger performance.

3 Claims, 7 Drawing Figures

«4,464,897»

EXHAUST MANIFOLD FOR AN INTERNAL COMBUSTION ENGINE PROVIDED WITH A TURBOCHARGER

BACKGROUND OF THE INVENTION

1. Field of the Invention

The present invention relates generally to an exhaust manifold for an internal combustion engine provided with a turbocharger, and more particularly to an exhaust manifold connecting between a trubocharger and the cylinder head of a four-cylinder in-line internal combustion engine.

2. Description of the Prior Art

A dynamic-pressure-type turbocharger is often used in an internal combustion automotive engine, in which the volume of a pipe leading exhaust gas from the engine to a turbine is designed as small as possible to effectively utilize the dynamic energy of the exhaust gas.

When a dynamic-pressure turbocharger of the aforesaid type is used in a multicylinder in-line internal combustion engine, exhaust gas emitted from each cylinder is simply collected in an exhaust manifold leading into a turbine. Since one exhaust stroke for one engine cylinder often overlaps with the exhaust stroke of another engine cylinder, the inner pressure within the exhaust pipe inevitably increases. Additionally, when an exhaust stroke overlaps an intake stroke, the pressure of discharging exhaust gas is reduced markedly, adversely effecting engine combustion efficiency. The above probldm is called exhaustion interference.

To overcome the aforsaid problems in an exhaust manifold connecting the cylinder head to the turbocharger in a four cylinder in-line engine, for example, where the firing sequence of the cylinders can be No. 1, No. 3, No. 4 and No. 2 or No. 1, No. 2, No. 4 and No. 3, the exhaust ducts communicating with cylinders No. 1 and No. 4 are disposed separately from those communicating with cylinder No. 2 and No. 3 to avoid exhaustion interference, i.e., alternating cylinders in the firing sequence can be connected without exhaustion interference.

In the prior-art exhaust manifold, however, since the length of one exhaust gas duct from one cylinder is not equal to that of another exhaust gas duct from another cylinder, it is impossible to accurately utilize the cyclic variation of exhaust gas pressure to pressure tune the turbine in the turbocharger.

The representative prior-art exhaust manifold for an internal combustion engine with a turbocharger will be described in more detail hereinafter with reference to FIGS. 1, 2 and 3.

SUMMARY OF THE INVENTION

It is a primary object of the present invention to provide a symmetrical exhaust manifold for a four-cylinder in-line internal combustion engine which facilitates utilization of cyclic exhaust gas pressure variation, that is, to achieve exhaust gas pressure tuning, while reducing energy loss and response delay.

To achieve the foregoing object, the exhaust manifold according to the present invention comprises first and second exhaust gas ducts disposed symmetrically with respect to the center of a turbocharger installing flange. The ducts connect between the upper exhaust gas outlet formed in the turbocharger installing flange and a pair of alternatingly-firing cylinder exhaust port. A single third exhaust gas duct connects between the exhaust ports of two adjacent, alternatingly-firing cylinders and the lower exhaust gas outlet formed in the turbocharger installing flange.

BRIEF DESCRIPTION OF THE DRAWINGS

The features and advantages of the exhaust manifold according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

To facilitate understanding of the present invention, representative prior-art exhaust manifolds for a four-cylinder in-line internal combustion engine are first discussed, with reference to the attached drawing.

Figure 1:
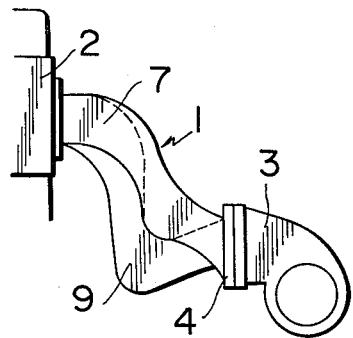
FIG. 1 is a front view of a representative prior-art exhaust manifold for a four-cylinder in-line internal combustion engine.
Figure 2:
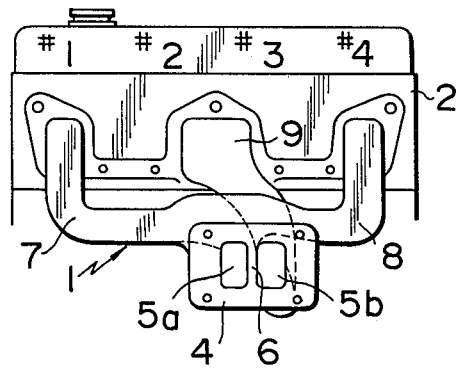
FIG. 2 is a side view of FIG. 1.

FIGS. 1 and 2 show a prior-art exhaust manifold 1 for a four cylinder in-line engine, in which the exhaust gas ducts are divided into two groups. Reference numeral 2 denotes a cylinder head of an engine, numeral 3 denotes a turbocharger. In exhaust manifold 1, a pair of right and left exhaust gas outlets 5a and 5b are formed in a turbocharger installing flange 4 positioned roughly in the middle of the exhaust manifold and separated by a partition 6 formed at the center of the flange. A branch duct 7 connected to cylinder No. 1 and another branch duct 8 connected to cylinder No. 4 join at exhaust outlet 5a. The other branch duct 9 connected to cylinders No. 2 and No. 3 and branching to each only at a position near the outer surface of cylinder, head 2 is connected to exhaust outlet 5b. Branch duct 9 is formed into such a shape that it bends slightly toward cylinder No. 4 and takes a roundabout way extending below branch duct 8 from cylinder No. 4.

Figure 3:
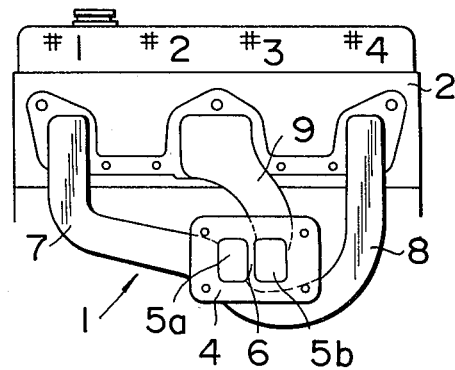
FIG. 3 is a side view of another prior-art exhaust manifold for a four-cylinder in-line internal combustion engine.

Conversely, as shown in FIG. 3, there exists another prior-art exhaust manifold where branch duct 8 from cylinder No. 4 follows an indirect path extending below branch duct 9.

In this connection, two types of ducts can be used between flange 4 and turbocharger 3, e.g., one having a non-split-type scrolled duct covering both the above-mentioned exhaust outlets 5a and 5b or one having a split type scrolled duct with another central partition extending from partition 6 on flange 4 to turbocharger 3.

In the above-mentioned prior-art exhaust manifolds 1, however, since branch ducts 9 or 8 take a plurality of turns, loss in exhaust gas energy (in temperature and pressure) inevitably increases and response delay occurs in turbocharger 3 due to the increase in volume of the exhaust gas duct.

Additionally, in the exhaust manifold shown in FIGS. 1 and 2, the length of the exhaust gas duct from cylinder No. 2 is not equal to that of the exhaust gas duct from cylinder No. 3. In the exhaust manifold shown in FIG. 3, the length of the exhaust gas duct from cylinder No. 1 is not equal to that of the exhaust gas duct from cylinder No. 4. Therefore, the variation of exhaust gas pressure is asymmetrical through each firing sequence at exhaust gas outlet 5a or 5b, and it is impossible to accurately utilize the cyclical variation of exhaust gas pressure. Consequently, cyclic exhaust gas pressure variation cannot be used to drive the turbine by way of exhaust gas pressure tuning. In more detail, exhaust pressure tuning can be achieved by, for instance, opening the exhaust gas valve of cylinder No. 4 after the exhaust gas valve of cylinder No. 1 has been opened to increase exhaust gas pressure and just when the reflected negative pressure wave thereof reaches cylinder No. 4. In this manner, it is possible to induce and employ exhaust gas pressure resonance. As described above, however, since exhaust gas ducts from the cylinders No. 2 and No. 3 are not equal to each other in length (FIGS. 1 and 2) and the exhaust gas ducts from cylinders No. 1 and No. 4 are not equal to each other in length (FIG. 3), it is impossible in these cases to utilize the effect of exhaust gas pressure resonance.

Although the overall lengths of the pairs of ducts may be quite different, both pairs of ducts can be made to induce resonance at the same engine speeds, i.e. the same exhaust port opening frequency, by designing the length of the longer ducts to be an integral multiple of the length of the shorter, i.e. to make the pressure wave propagation of one a harmonic of the other.

In view of the above description, reference is now made to the embodiments of the exhaust manifold for a four-cylinder in-line internal combustion engine provided with a turbocharger according to the present invention.

Figure 4:
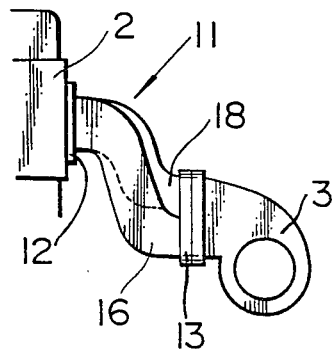
FIG. 4 is a front view of a first embodiment of the exhaust manifold for a four-cylinder in-line internal combustion engine according to the present invention.
Figure 5:
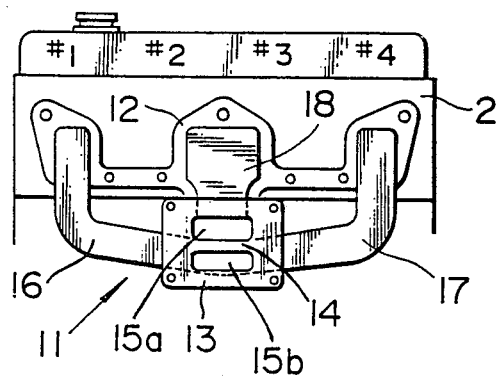
FIG. 5 is a side view of FIG. 4.

FIGS. 4 and 5 shows a first embodiment of exhaust manifold 11 for a four-cylinder in-line internal combustion engine according to the present invention. In figure, reference numeral 12 denotes a cylinder-mounting flange, numeral 13 denotes a turbocharger mounting flange. Flange 13 is positioned at roughly the center of and somewhat lower than cylinder head 2. Flange 13, to which a turbocharger is mounted, is provided with a pair of upper and lower exhaust gas outlets 15a and 15b separated by a horizontal partition 14. A branch duct 16 connected to cylinder No. 1 and a branch duct 17 connected to cylinder No. 4, roughly in three-dimensional mirror symmetry, extend downward from cylinder installing flange 12 and horizontally inward therefrom to lower portion of turbocharger installing flange 13. Ducts 16, 17 join at turbocharger installing flange 13 in communication with lower exhaust gas outlet 15b. Branch duct 18 is connected to both of cylinders No. 2 and No. 3 and extends approximately directly towards turbocharger 3 for connection to the upper portion of turbocharger installing flange 13. The exhaust gas ducts for cylinders No. 2 and No. 3 merge within branch duct 18 communicating with upper exhaust gas outlet 15a. In other words, in exhaust manifold 11, respective branch ducts 16, 17, and 18 are formed symmetrically with respect to exhaust gas outlets 15a and 15b, or with respect to the center of turbocharger installing flange 13.

Therefore, in exhaust manifold 11, the lengths of the exhaust gas ducts from cylinders No. 1 and No. 4 which merge at exhaust gas outlet 15b are equal; also, the lengths of the exhaust gas ducts from cylinders No. 2 and No. 3 which merge within branch duct 18 are the same. Accordingly, the variation of exhaust gas pressure at exhaust gas outlet 15a or 15b has equal time intervals, and it is possible to advantageously utilize exhaust gas pressure resonance by way of exhaust gas pressure tuning. Further, since there are no unnecessary indirect portions in the respective branch ducts 16, 17, and 18, it is possible to obtain the shortest possible exhaust gas duct length, thus limiting energy loss in exhaust gas pressure and response delay in turbocharger 3 to a minimum.

Figure 6:
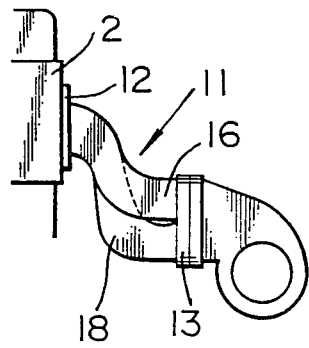
FIG. 6 is a front view of a second embodiment of the exhaust manifold for a four-cylinder in-line internal combustion engine according to the present invention.
Figure 7:
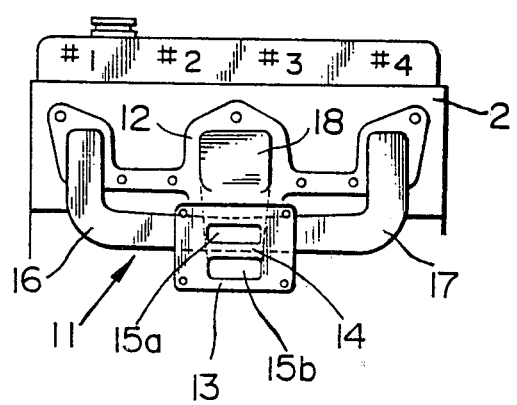
FIG. 7 is a side view of FIG. 6.

FIGS. 6 and 7 show a second embodiment of exhaust manifold 11 for a four-cylinder in-line internal combustion engine according to the present invention, in which a similar structure is adopted.

In this embodiment as compared to the first embodiment shown in FIGS. 4 and 5, branch ducts 16 and 17 for cylinders No. 1 and No. 4 are connected to upper exhaust gas outlet 15a and branch duct 18 for cylinders No. 2 and No. 3 is connected to lower exhaust gas outlet 15b.

As described above, in the exhaust gas manifold according to the present invention, since it is possible to ensure that the lengths of exhaust gas ducts leading to the respective exhaust gas outlets are equal to each other, respectively, it is possible to easily achieve exhaust gas tuning, thus enabling use of the resonance effect of exhaust gas pressure to improve engine output and the revolution speed of the turbocharger at relatively low engine speeds. Furthermore, since the lengths of the respective branch ducts can be shortened noticeably, it is possible to minimize the volume of the manifold and to improve the efficiency and response speed of the turbocharger by improving the dynamic pressure of exhaust gas.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. An exhaust manifold for a four-cylinder in-line internal combustion engine, being connected between a cylinder head and a turbocharger, which comprises:
   (a) a first exhaust duct communicating with a first cylinder;
   (b) a second exhaust duct communicating with a fourth cylinder firing non-sequentially with respect to said first cylinder, said first and second exhaust ducts being of substantially equal length;
   (c) a third exhaust duct communicating with the remaining second and third cylinders; and
   (d) a split-type turbocharger-mounting flange having a pair of exhaust gas outlets divided by a horizontal partition into an upper opening portion and a lower opening portion (15b) of substantially equal dimension to each other for connecting said first and second exhaust ducts together to the turbocharger through one of the upper and lower opening portions thereof and connecting said third exhaust duct to the turbocharger through the other of the upper and lower opening portions thereof, said split-type mounting flange containing the upper and lower opening portions facilitating the equal-length arrangement of exhaust ducts to obtain an exhaust gas pressure resonance effect.

2. An exhaust manifold for a four-cylinder in-line internal combustion engine as set forth in claim 1, wherein said first exhaust duct and said second exhaust duct are connected to the lower exhaust gas outlet of said turbocharger-mounting flange, and said single third exhaust duct is connected to the upper exhaust gas outlet of said turbocharger-mounting flange, said cylinders having a firing sequence of 1-3-4-2 or 1-2-4-3.

3. An exhaust manifold for a four-cylinder in-line internal combustion engine as set forth in claim 2, wherein said first exhaust duct and said second exhaust duct are connected to the upper exhaust gas outlet of said turbocharger-mounting flange and said single third exhaust duct is connected to the lower exhaust gas outlet of said turbocharger-mounting flange, said cylinder having a firing sequence of 1-3-4-2 or 1-2-4-3.

* * * * *